Jan. 22, 1952  A. H. LLOYD ET AL  2,583,299
ELECTRICALLY OPERATED CHUCK OR MACHINE TOOL
Filed Feb. 4, 1949  3 Sheets-Sheet 1
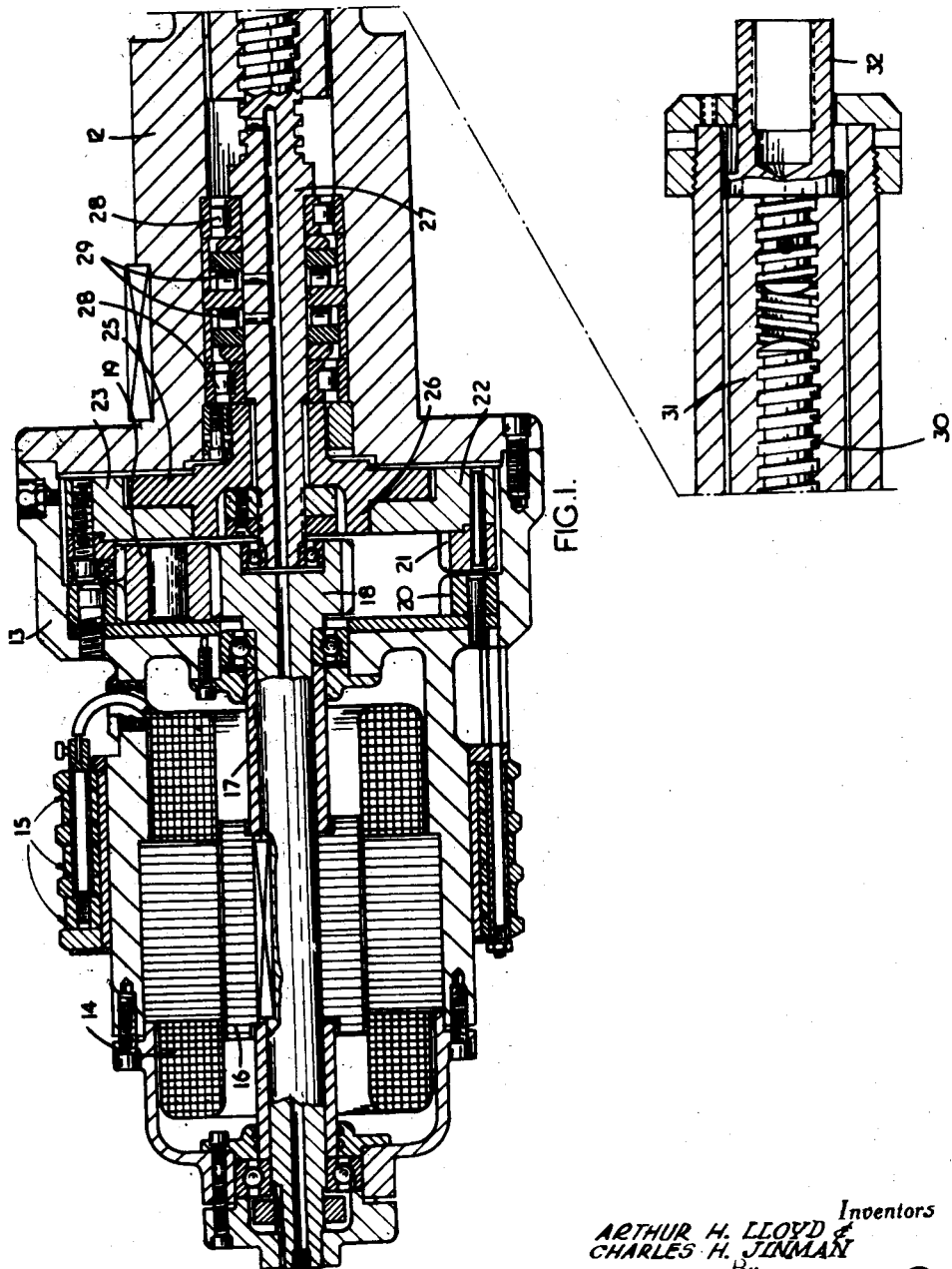
Inventors
ARTHUR H. LLOYD &
CHARLES H. JINMAN
By
Mawhinney & Mawhinney
Attorney Jan. 22, 1952  A. H. LLOYD ET AL  2,583,299
ELECTRICALLY OPERATED CHUCK OR MACHINE TOOL
Filed Feb. 4, 1949  3 Sheets-Sheet 2
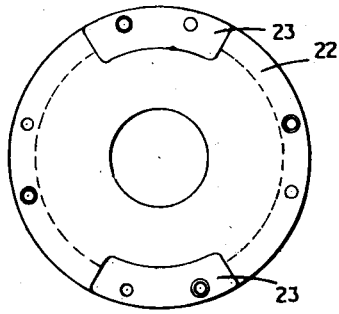
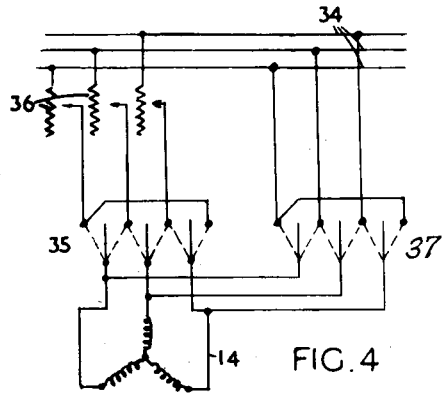
FIG. 3.
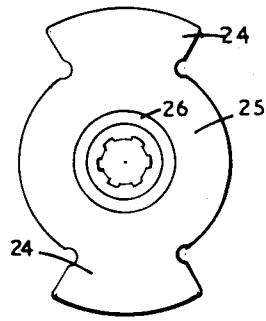
FIG. 2.
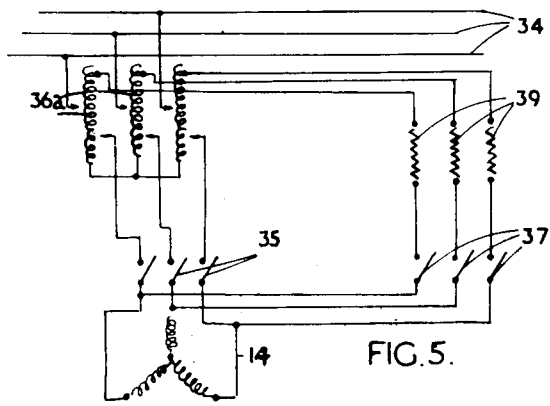
FIG. 5.
Inventors
ARTHUR H. LLOYD &
CHARLES H. JINMAN
By
Mawhinney & Mawhinney
Attorney Jan. 22, 1952 A. H. LLOYD ET AL 2,583,299
ELECTRICALLY OPERATED CHUCK OR MACHINE TOOL
Filed Feb. 4, 1949 3 Sheets-Sheet 3

INVENTORS
A. H. LLOYD &
BY C. H. JINMAN
Att'ys.

Patented Jan. 22, 1952

2,583,299

UNITED STATES PATENT OFFICE 2,583,299

ELECTRICALLY OPERATED CHUCK OR MACHINE TOOL

Arthur H. Lloyd and Charles H. Jinman, Coventry, England, assignors to Alfred Herbert Limited, Foleshill, Coventry, England Application February 4, 1949, Serial No. 74,566
In Great Britain February 23, 1948

4 Claims. (Cl. 318—230)

This invention relates to an electrically-operated chuck for a machine tool, of the kind including a reversible electric motor connected to the chuck-operating means through an appropriate speed-reduction gearing and an irreversible mechanism, such as a screw-and-nut mechanism.

The main object of the invention is to arrange for a relatively light grip to be provided by the chuck on the work when this should be desired, whilst still ensuring satisfactory operation.

British patent specification No. 416,153, in the names of Alfred Herbert Limited and the present applicants, discloses an electrically-operated chuck which has proved to be very satisfactory in practice. It is found, however, that if a lower voltage than that available (i. e., the designed voltage) is applied to the motor in order that the chuck should have a relatively light grip on the work, the motor is then not always able, initially, to free the parts when it is desired to open the chuck; and, conversely, having fully opened the chuck, the motor is then at times incapable of initiating movement of the parts when it is again desired to close the chuck.

The present invention consists in two different-voltage circuits which are sequentially connected to the motor by a switching means (operable in different ways dependently upon whether the chuck is to be opened or closed) so as first momentarily to supply the motor from the higher voltage circuit, in order to free and initiate movement of the parts, and then to supply the motor from the lower voltage circuit for completing the movement of the parts.

It will be understood that the higher voltage circuit should provide a voltage which is sufficiently high for initiating movement of the parts, whether opening or closing the chuck, whilst the lower voltage circuit, of which the voltage is preferably adjustable in any usual manner, need only provide a sufficient voltage for maintaining the movement of the parts once their movement has been initiated, so as to provide a lighter grip, when closing the chuck, than would be obtained if the higher voltage were being employed throughout the closing movement.

In the accompanying drawings:

Figure 1 is a longitudinal section of one form of electrically-operated means for a chuck, for a relatively large machine tool, arranged according to the invention;

Figure 2 is an elevational view, taken from the left of Figure 1, of the driven element of a lost-motion connector in the drive, and Figure 3 is a similar view, but taken from the right, of the driving element thereof, both views being to a smaller scale;

Figures 4 and 5 show two alternative forms of two different-voltage circuits;

Figure 6:
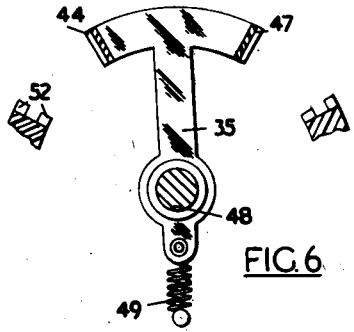
Figures 6 and 7 shows diagrammatically how different parts of a single switching unit may be arranged to control the two different-voltage circuits, the switch of Figure 6 controlling the lower voltage circuit and that of Figure 7 the higher voltage circuit.
Figure 7:
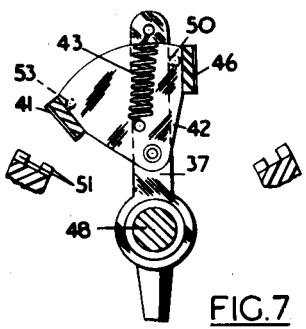
Figure 6A:
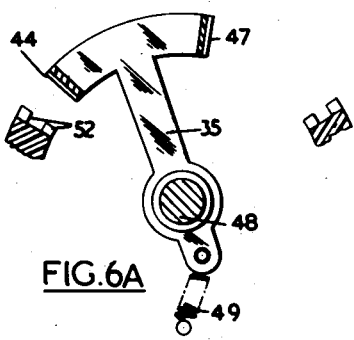
Figure 7A:
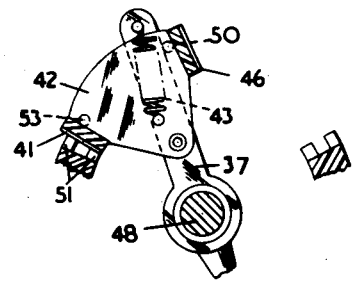
Figure 6B:
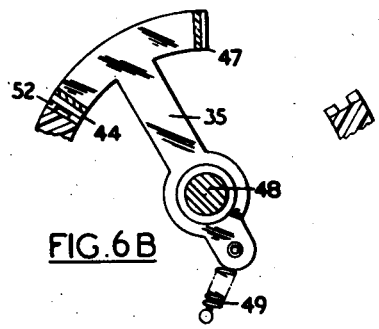
Figure 7B:
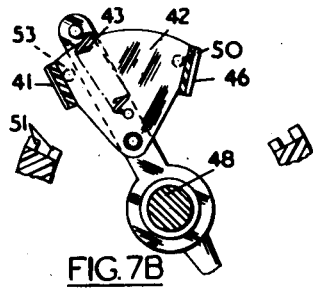

Figures 6a and 7a indicate the positions of the switches when in an intermediate and temporary position during the beginning of operating the chuck, for example, closing the chuck; and Figures 6b and 7b show the positions of the switches during the final movement of the chuck parts during this operation.

The drawings show part of the spindle 12 of a machine tool, and fast with a casing 13, secured to the spindle, is a stator winding 14 of a reversible electric motor shown as a three-phase motor supplied from the slip rings 15. The rotor 16 of the motor, which revolves in unison with the stator except when the chuck is to be operated, is fast on a shaft 17 journalled in the casing 13 and driving a sun gear 18 of a planetary gearing. The latter has at least one freely mounted planet gear 19 in mesh with the sun gear and also with two internally-toothed annuli, 20 and 21, having different numbers of teeth, for example, 51 teeth and 54 teeth, respectively. The annulus 20 is fast with the casing 13, i. e., with the spindle. The annulus 21 is fast with the driving element 22 (Figure 3) of a lost-motion connector, the driving element having a pair of diametrically-opposite axially-extending teeth 23, 23 with which coact teeth 24, 24 on the driven element 25 of the connector, the latter having a hub 26 upon which the driving element 22 is rotatably mounted.

As shown, the lost-motion connector provides for a free movement of about 60°, and this allows of the motor speeding up to full speed, or almost to full speed, before the lost-motion will be taken up.

The driven element 25 of the lost-motion connector is fast on an axially-located shaft 27 journalled in the spindle 12 through journal bearings 28, 28, whilst end thrust bearings 29 are provided between the journal bearings. The shaft 27 terminates with a worm 30 engaged by a nut 31 which is slidingly connected to the spindle but held against rotation with respect thereto, and which is also connected in any suitable manner to a draw bar 32 by which the chuck (not shown)

can be opened and closed dependently upon the direction of movement of the draw bar, i. e., dependently upon the direction of rotation of the worm 30, i. e., of the motor.

In Figure 4 the mains are indicated at 34, and the stator winding is marked 14. A main switch 35 can connect the stator winding to the mains through an adjustable resistor 36. The mains may carry a voltage supply of, say, 450, and the resistor may have, say, tappings for 400, 350, 270 and 210 volts. By means of the main switch 35 the stator winding can be supplied with an adjusted voltage dependently upon the degrees of grip required of the chuck on the work.

In parallel therewith is an auxiliary switch 37 by means of which the mains can be directly connected to the stator winding in order to supply a high voltage (450 volts in the present instance) for initiating the movement of the parts when a chucking or unchucking operation is to be effected. So soon as the parts have started moving, and, for example, before the lost-motion above-mentioned has been taken up, the auxiliary switch 37 can be opened and the main switch 35 closed in order that the chucking or unchucking operation may be completed at the lower selected voltage.

In the modification shown by Figure 5, use is made of an auto-transformer 36a, instead of the resistor 36, which conveniently has similar tappings to those above-mentioned and from which the stator winding 14 can be supplied by the main switch 35, with a desired reduced voltage, whilst a higher voltage can be supplied through the auxiliary switch 37, through the fixed resistor 39 if desired.

Figures 6 and 7 show only one of the phases of each main and auxiliary switch, and actually both switches are incorporated into a single unit which has a common operating shaft 48, carrying the main switch element 35 and the auxiliary switch element 37, the shaft being biassed to the neutral position shown, as by means of a spring 49. When turned anti-clockwise, the bridging member 41 on the rockable element 42 (biassed by a compression spring 43 to an off-centre position relatively to the auxiliary switch element 37 as shown, in which it is held by a stop 50 engaging the element 37) will engage the co-operating contacts 51 before the bridging member 44 of the main switch element 35 engages its co-operating contacts 52, as shown by Figures 6a and 7a, thus initially to apply the high voltage to the stator winding. Continued movement of the actuating shaft in the same direction will rotate the rocking member 42 clockwise relatively to the element 37 until the compression spring 43 passes over centre, whereupon the bridging member 41 immediately breaks circuit and disengages the supply of the high voltage—just before the bridging member 44 engages its associated contacts 52 in order to supply the stator winding with the selected voltage, as shown by Figures 6b and 7b. The clockwise movement of the member 42 in that manner is limited by its stop 53 engaging the element 37. The operator then holds the actuating shaft 48 in this position until the chuck operation has been completed, and, on releasing it, the switch parts return to the position shown by Figures 6 and 7—except that now the rocking element 42 will be offset to the other side of the element 37, so that when the actuating shaft 48 is turned in a clockwise direction, the bridging member 46 will engage its associated contacts and, as previously described, then disengage therefrom just before the bridging member 47 of the main switch 35 engages its associated contacts.

What we claim as our invention and desire to secure by Letters Patent of the United States is:

1. Electrically-operating means, for the chuck of a machine tool, including a reversible electric motor, a chuck-operating means, a speed-reduction gearing and an irreversible mechanism through which said motor is connected to said chuck-operating means, two different-voltage circuits, and a switching means having a single operating member movable from a neutral position to an operative position, when the chuck is to be opened or closed, to momentarily connect the higher voltage circuit to said motor, in order to free and initiate movement of the parts, and to then connect the lower voltage circuit to said motor to complete the movement of said parts.

2. Electrically-operating means, for the chuck of a machine tool, including a reversible electric motor, a chuck-operating means, a speed-reduction gearing and an irreversible mechanism through which said motor is connected to said chuck-operating means, two different-voltage circuits, and a switching means operable by movement of a single operating member from a neutral position to one or other of two different operative positions for respectively opening or closing the chuck, said switching means including two switches interconnected for operation in timed relation, one of said switches serving to momentarily connect said motor to the higher voltage circuit, in order to free and initiate movement of the parts, and the other of said switches serving to then connect said motor to the lower voltage circuit to complete the movement of said parts.

3. Electrically-operating means, for the chuck of a machine tool, including a reversible electric motor, a chuck-operating means, a speed-reduction gearing and an irreversible mechanism through which said motor is connected to said chuck-operating means, high and low voltage circuits, and a switching means by which, when the chuck is to be opened or closed, the high voltage circuit is initially momentarily connected to said motor, in order to free and initiate movement of the parts, and by which the low voltage circuit is then connected to said motor to complete the movement of said parts, said switching means comprising pairs of normally-open relatively-reversing high and low voltage contacts included in both said circuits and disposed in spaced relation, a movable switch member between said spaced pairs of contacts, pairs of high and low voltage bridging elements on opposite sides of said member positioned to bridge each a pair of contacts upon movement of the member in one or the other direction, a carrier for the high voltage bridging contacts mounted to move with and relatively to said movable switch member, and means for shifting said carrier relatively to the switch member on continued movement in the same direction of the switch member after closing a high voltage bridging element with a pair of its respective contacts whereby to automatically withdraw said bridging element from said pair of high voltage contacts to open the previously closed high voltage circuit and to reset the carrier for a subsequent closing reversing operation at the opposite side of the switching means, said pairs of contacts and said bridging elements being so related in position that said high voltage bridging element first closes the high voltage circuit and thereafter opens the high voltage circuit just before the low voltage bridging element arrives to close the low voltage circuit.

4. Electrically-operating means as claimed in claim 3 in which the carrier is pivoted to said switch member to swing toward and from the high voltage pairs of contacts, said carrier-shifting means comprising a compression spring connected between said switch member and a point on said carrier adjacent the pivot point of the carrier in which the thrust axis of the spring shifts to opposite sides of the dead center position when the carrier is swung angular in opposite directions.

ARTHUR H. LLOYD.
CHARLES H. JINMAN.

REFERENCES CITED

The following references are of record in the file of this patent:

UNITED STATES PATENTS

| Number | Name | Date |
|---|---|---|
| 531,432 | Bell | Dec. 25, 1894 |
| 830,947 | Whitehurst | Sept. 11, 1906 |
| 926,243 | Clary | June 29, 1909 |
| 1,097,428 | Hall | May 19, 1914 |
| 1,292,381 | Smith et al. | Jan. 21, 1919 |
| 1,898,242 | Chandler | Feb. 21, 1933 |
| 2,193,634 | Lukens | Mar. 12, 1940 |
| 2,196,402 | Snyder | Apr. 9, 1940 |

FOREIGN PATENTS

| Number | Country | Date |
|---|---|---|
| 416,153 | Great Britain | Sept. 13, 1934 |